US009083797B2

(12) United States Patent
Monaco et al.

(10) Patent No.: US 9,083,797 B2
(45) Date of Patent: *Jul. 14, 2015

(54) PRIVACY-ENABLED TELEPHONE DIRECTORY

(75) Inventors: Peter Monaco, Los Altos, CA (US); Kamal K. Acharya, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 661 days.

This patent is subject to a terminal disclaimer.

(21) Appl. No.: 13/150,963

(22) Filed: Jun. 1, 2011

(65) Prior Publication Data

US 2012/0028610 A1    Feb. 2, 2012

Related U.S. Application Data

(63) Continuation of application No. 11/924,374, filed on Oct. 25, 2007, now Pat. No. 7,979,060.

(51) Int. Cl.
*H04W 4/00* (2009.01)
*H04M 3/493* (2006.01)
*H04M 3/38* (2006.01)
*H04M 3/42* (2006.01)
*H04M 3/436* (2006.01)

(52) U.S. Cl.
CPC ............ *H04M 3/4935* (2013.01); *H04M 3/382* (2013.01); *H04M 3/4211* (2013.01); *H04M 3/42195* (2013.01); *H04M 3/436* (2013.01); *H04M 2203/6009* (2013.01)

(58) Field of Classification Search
CPC ... H04M 3/42042; H04M 1/57; H04W 88/06; H04W 92/02
USPC ................ 455/426.1, 415, 432.3, 461, 463
See application file for complete search history.

(56) References Cited

U.S. PATENT DOCUMENTS

| | | | |
|---|---|---|---|
| 6,160,877 A | 12/2000 | Tatchell et al. | |
| 7,979,060 B2 * | 7/2011 | Monaco et al. | 455/415 |
| 2005/0053221 A1 * | 3/2005 | Reding et al. | 379/211.02 |
| 2005/0060417 A1 * | 3/2005 | Rose | 709/228 |
| 2007/0226240 A1 * | 9/2007 | Bloebaum et al. | 707/101 |

* cited by examiner

*Primary Examiner* — Nghi H Ly
(74) *Attorney, Agent, or Firm* — Steven Spellman; Danielle Johnston-Holmes; Micky Minhas

(57) ABSTRACT

A privacy-enabled telephone directory is disclosed that is implemented through a contact facilitator. The contact facilitator receives a contact request from a caller which includes the name of the party to be called and disambiguation information to distinguish the called party. The contact facilitator applies the disambiguation information to entries in a disambiguation database to select the mobile telephone user corresponding to the contact request information. The contact facilitator then accesses a profile database to retrieve the called party's profile which contains directions for processing the request. Possible directions include immediately connecting the caller with the called party, batching the call, or following other specific instructions regarding the contact request. Profile instructions may be changed by the mobile telephone user at any time.

18 Claims, 4 Drawing Sheets

PRIVACY-ENABLED TELEPHONE DIRECTORY

This application is a continuation of U.S. patent application Ser. No. 11/924,374, filed Oct. 27, 2007, titled "PRIVACY-ENABLED TELEPHONE DIRECTORY," the entirety of which application is incorporated by reference herein.

BACKGROUND

Telephone directories can provide listings of subscribers, their corresponding telephone numbers, and street addresses. Traditionally, white pages directories list subscribers in a certain geographical area, and subscribers may choose to have an unlisted number or a partially unlisted number by requesting that certain information be excluded from the listing. Thus, the telephone directory may list a subscriber, partial information about the subscriber, or no information, not even a name, for the subscriber. Once the subscriber has indicated his preference for a listed, partially unlisted, or totally unlisted number, the subscriber cannot change his preference until the next publication of the telephone directory.

In addition, maintaining white pages for rapidly changing information like email addresses, mobile telephone numbers, work telephone numbers, and the like is difficult.

Other limitations of existing or prior systems will become apparent to those of skill in the art upon reading the following Detailed Description.

SUMMARY

A contact facilitator implementing a privacy-enabled telephone directory provides contact information to callers subject to receiving disambiguation information from callers to uniquely distinguish the party to be contacted. The contact facilitator can also provide mobile telephone subscribers with the ability to flexibly control the distribution of their contact information, receive call routing services, and receive call connection services.

The contact facilitator receives a request to contact a mobile telephone user from a caller. The request will typically include the name of the mobile telephone user to be contacted and some other information to distinguish the mobile telephone user from others with the same name. The contact facilitator uses the disambiguation information to distinguish a unique mobile telephone user from a plurality of mobile telephone users in a disambiguation database.

Each mobile telephone user provides instructions to the contact facilitator in a profile indicating that the user wishes to be connected to the caller immediately, the call should be batched and sent to the user at a later time, or other instructions, perhaps indicating that the user's contact information should or should not be provided to the caller.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Examples of a privacy-enabled telephone directory are illustrated in the figures. However, the examples and figures are illustrative rather than limiting. The privacy-enabled telephone directory is limited only by the claims.

DETAILED DESCRIPTION

A telephone directory is useful to callers attempting to contact a person whose number is unknown to the caller. However, the person to be reached may not want to be contacted by every caller and may request to unlist his or her telephone number for a variety of reasons. Yet, in choosing to make a telephone number unavailable through the telephone directory, a person may miss telephone calls that the user would perhaps prefer to receive.

Figure 1A:
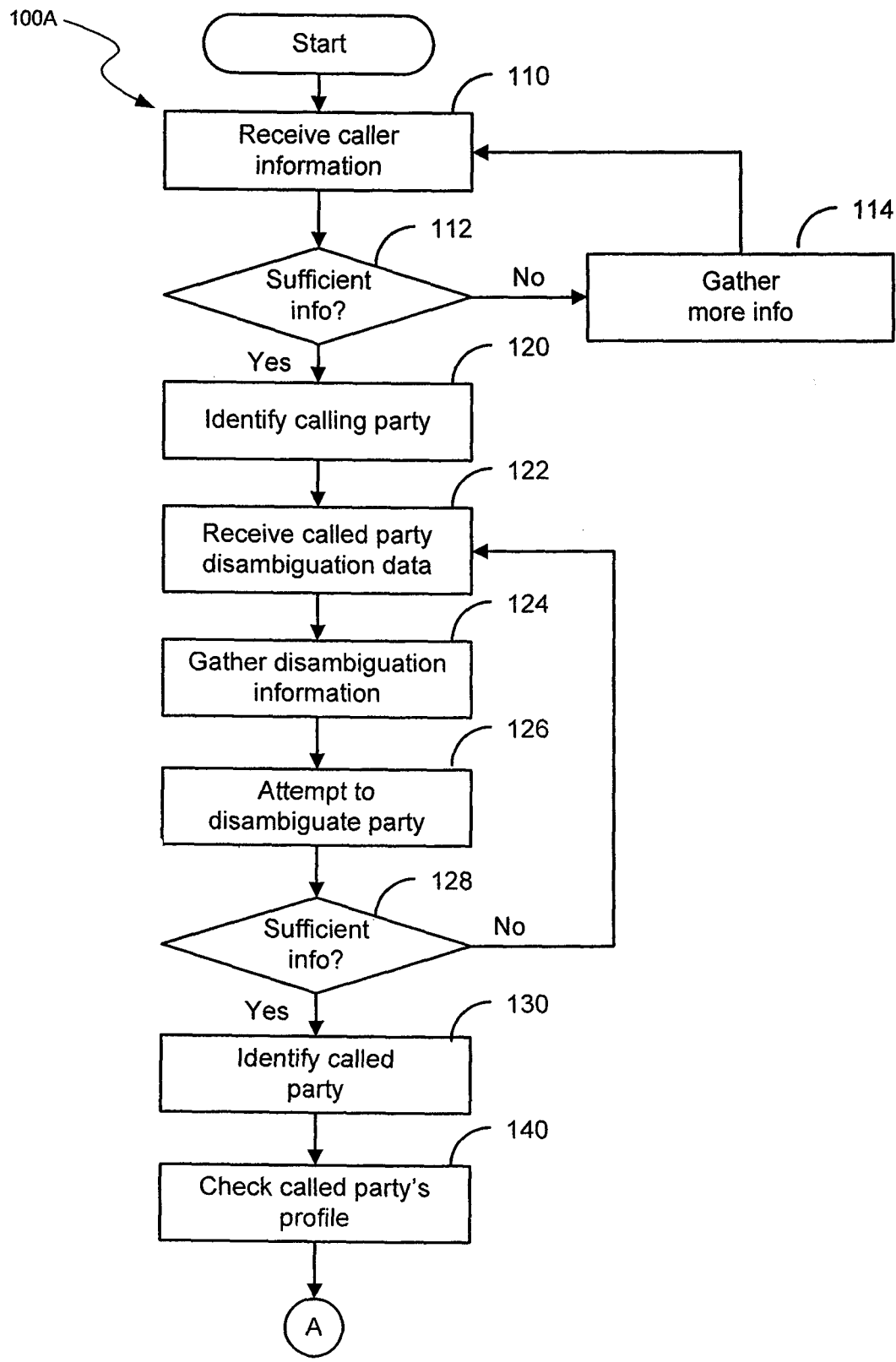
FIG. 1 is a flow chart illustrating an example of a method of providing a privacy-enabled telephone directory.
Figure 1B:
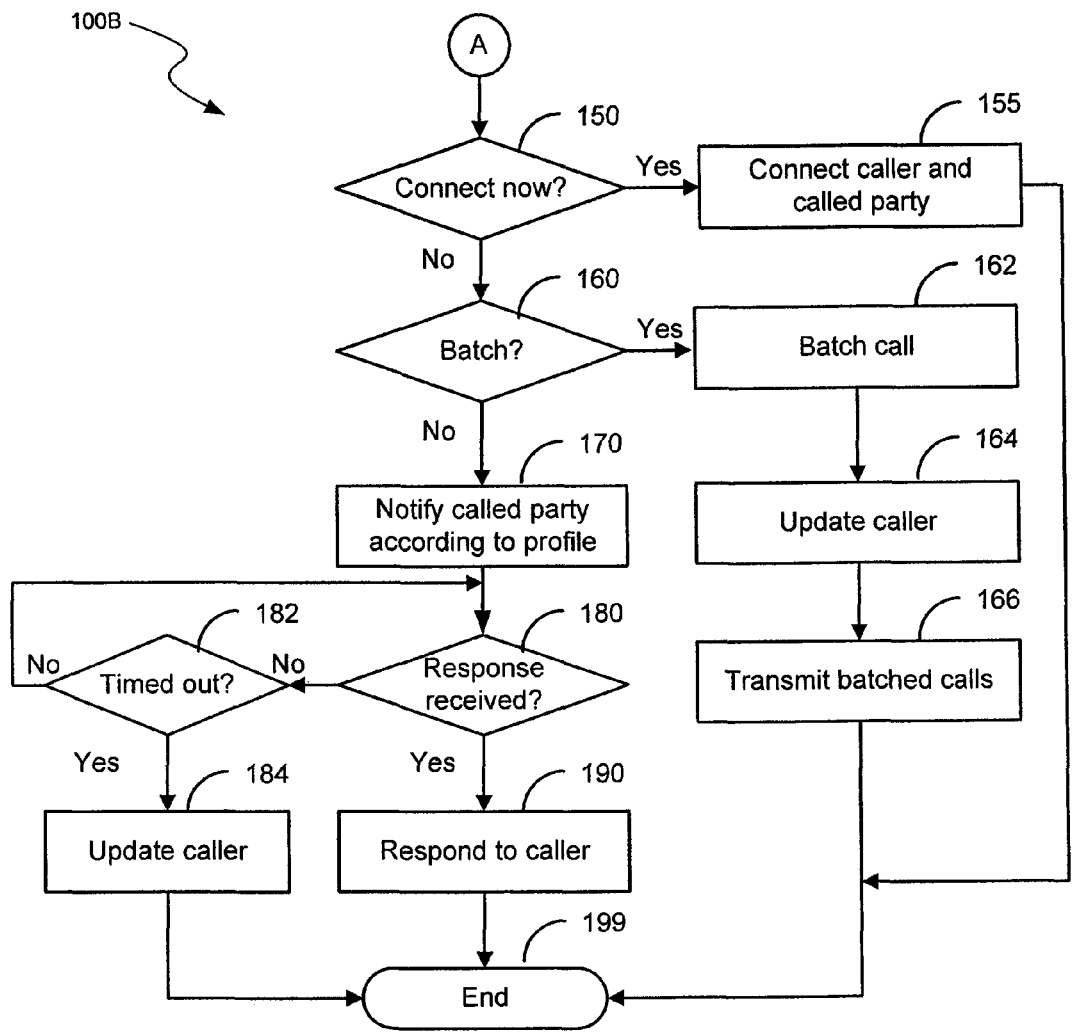

A privacy-enabled telephone directory (PETD) can offer telephone users, and particularly mobile telephone users, the ability to pre-filter the callers attempting to contact them, control the distribution of their contact information, specify specific call routing and connection services. Thus, the PETD would be useful to callers who are in need of contacting a mobile telephone user as well as to mobile telephone users who prefer to screen calls from a caller using the PETD to obtain contact information. FIG. 1 is a flow chart 100 illustrating an example of a method of providing a privacy-enabled telephone directory.

In block 110, a caller initiates a request by providing his name to the contact facilitator module of the PETD. The caller may initiate the request through any method, including by way of example but not limitation a telephone call from either a land line or a mobile telephone, on the Internet over a telephony network, by email, or by some other known or convenient communication system.

Decision block 112 extracts the caller's identification information as provided by the network over which the caller's request was initiated, through the mobile identification number of a mobile telephone, or in the header information in an email message or VoIP system. The information provided by the caller in block 110 is compared against the extracted information in decision block 112. If there is a discrepancy, the contact facilitator gathers more information in block 114. The information gathered may include requesting more information from the caller and re-extracting the caller's identification information from the network until a match is confirmed. When the match is confirmed in decision block 112, the caller is identified, and the information may be used subsequently by the contact facilitator to inform the called party, to follow instructions in the called party's profile, or to connect the caller to the called party. Alternatively, the caller may provide an identifying password previously selected by the caller which serves as an identifier regardless of the identification information extracted from the network.

The caller's request should include the name of the party to be reached and enough additional information about the party to be reached to distinguish that party from other mobile telephone users listed in the database. Uses for the additional information include distinguishing between users who have the same first name and surname, filtering out callers who are fishing for contact information and do not know the called party, and confirming that the user identified as the called party is the party the caller is trying to reach. The additional information is defined as disambiguation information because the information serves to remove any ambiguity about the identity of the party to be reached, thus disambiguating a mobile telephone user from a plurality of mobile telephone users subscribing to the PETD service. The contact facilitator can use the disambiguation information provided by the caller to retrieve mobile telephone user entries stored in a disambiguation database that match the given disambiguation information. Examples of disambiguation information include, but is not limited to, the party's address or a portion of the address such as the town, a date or year of birth, the party's employer, an identifying password selected by the party for identification purposes, the party's alma mater, whether high school, college, or any other institution of any level. Even the caller's own name may be used as disambiguation information if the party to be reached has placed the caller's name upon a list of acceptable contacts. It will be apparent to a person skilled in the relevant art that many other types of disambiguation information may be used to distinguish mobile telephone users. In particular, disambiguation information may be different depending upon the nature of the group of subscribers to the PETD. For example, a PETD may be used across multiple college campuses, across multiple companies and subsidiaries of a parent company, or across members of one or more unions.

Disambiguation information is provided by the caller in block 124. In block 126, the contact facilitator in the PETD uses the disambiguation information to search through entries in a disambiguation database to disambiguate the mobile telephone user the caller is trying to reach. In one embodiment, disambiguation may be carried out by retrieving all disambiguation records corresponding to mobile telephone users having the exact name provided by the caller. If the disambiguation information provided by the caller in block 124 is insufficient to uniquely identify one mobile telephone user, as tested in decision block 128, the contact facilitator may request further disambiguation information in block 124. Alternatively, the contact facilitator may be required to use at least one or more pieces of disambiguation information only as a filter to confirm that the retrieved record indeed corresponds to the party that the caller is attempting to reach, and if multiple mobile telephone users correspond to the disambiguation information, the contact facilitator may be programmed to continue by contacting each mobile telephone user identified in the manner described below.

If a unique mobile telephone user is disambiguated from the plurality of mobile telephone users in the database, then the identity of that user is identified in block 130 as the called party. The called party's profile as stored in a profile database is retrieved and reviewed in block 140. Decision block 150 queries the profile as to whether the caller should be connected to the party immediately. If so, the profile may also state a preferred number to which the caller should be connected. The contact facilitator makes the connection in block 155, and the contact request is complete.

Alternatively, the profile may state that all calls are to be batched. A party may choose to batch calls from certain callers, calls from a caller not on a specified list, calls received during a certain time period, or according to any other batching criteria. The batching option is queried at decision block 160. If the batching instruction applies to the call, block 162 batches the call according to the preferences in the profile. Preferences for batching may include calling the party, emailing the party at a specified email address, or transmitting by SMS to a specified mobile telephone number. It will be apparent to a person skilled in the art that other methods of delivering batched calls may be specified by a party. The time at which the batched calls should be sent may be specified for a particular time each day, every hour, once a week, or according to any other preferences. The information provided to the called party during the delivery of the batched calls may include the identity of the caller, any other information specified by the called party in the profile such as disambiguation information provided by the caller, or any message provided by the caller. If the party being reached has specified that the call be batched, the batched call is transmitted to the called party in block 166. At the time that the contact facilitator batches the call according to the profile instructions of the called party, the caller is updated in block 164 about the batching of the call request. The profile instructions may also indicate whether the called party is to be provided further information such as a direct number to reach the called party, when the batched calls are scheduled to be delivered, or any other message specified in the called party's profile. After the caller is notified, the contact request is considered complete.

If the called party has not specified that the call should be immediately connected or batched, the called party is notified in block 170 according to the instructions specified in the profile. It will be apparent to a person skilled in the art that other instructions for the contact facilitator may be specified by the profile. Possible instructions for notifying the called party include the modality to be used, such as notifying the called party by SMS, emailing the called party, or making a telephone call to the called party. The information provided to the called party during the notification may include the identity of the caller, any other information specified by the called party in the profile such as the disambiguation information provided by the caller, or any message the caller wishes to be delivered.

In decision block 180, the contact facilitator waits for a response from the called party. The contact facilitator has a pre-set time during which it will wait for a reply from the called party. If the timeout expires in decision block 182, the contact facilitator notifies the caller in block 184 that no response has been received along with any other information the called party has previously indicated in the profile. Then the contact request is considered complete.

If the called party responds within the timeout period, further instructions may be provided to the contact facilitator. The caller may grant approval to be connected to the caller immediately, request that the called party's telephone number or alternative contact information such as an email address be provided to the caller, request that a message be transmitted to the caller, or make any other request. The contact facilitator provides the information to the caller in block 190, and the contact request is considered complete.

Figure 2:
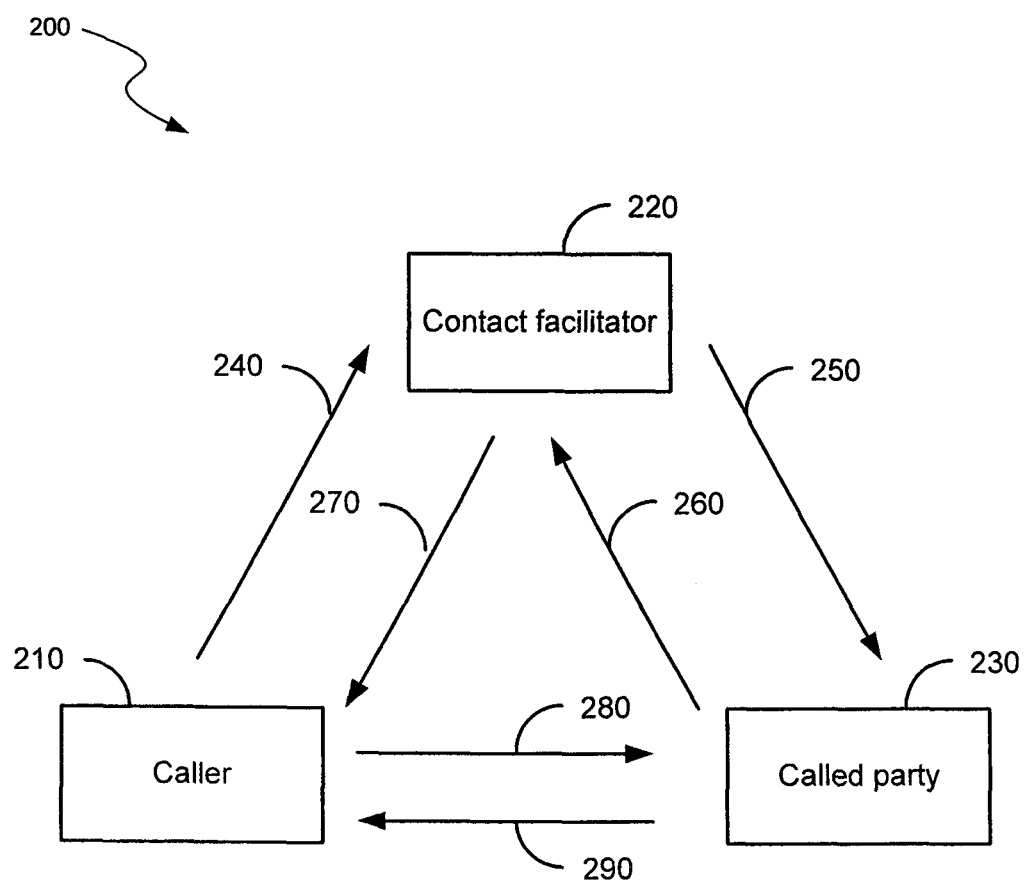
FIG. 2 is a diagram depicting an example of a privacy-enabled telephone directory.

FIG. 2 is a diagram 200 of one embodiment of the PETD. A caller 210 sends a contact request to the contact facilitator 240 either through the telephony network 230 or through an alternative communications network 270 such as an email network.

The contact facilitator 240 consists of several program modules 290: a request receiver module 260, a caller information gathering module 261, a called party information gathering module 262, a disambiguation module 263, a request processing module 264, a response disposal module 265, and a contact module 266. The program modules 290 can access three databases: a listing database 252, a profile database 254, and a disambiguation database 256. It will be apparent to a person skilled in the art that the entries in the databases may be combined into a single database or partitioned into other numbers and categories of databases.

The request receiver module 260 receives contact requests from the caller 210. The caller 210 provides personal identifying information as part of the contact request. Then the caller information gathering module 261 confirms the identity of the caller 210 by extracting the caller's identification information as provided by the network over which the caller's request was initiated, as described in block 120. If there is no match, the request receiver module 260 queries the caller 210 for further information and re-extracts identification information again until an identity for the caller is confirmed. Alternatively, the caller may provide an identifying password previously selected by the caller which serves as an identifier regardless of the identification information extracted from the network.

The called party information gathering module 262 takes the called party's name and accesses the disambiguation database 256 to retrieve matching entries. Entries in the disambiguation database 256 associate a mobile telephone user's name with disambiguation entries, for example, the person's address or a portion of the address such as the town, a date or year of birth, the person's employer, an identifying password selected by the person for identification purposes, the person's alma mater, whether high school, college, or any other institution of any level. It will be apparent to a person skilled in the art that many other pieces of disambiguation information may be used, including specialized information used by members of the group which the mobile telephone user is reached is a part of. Once the entries corresponding to the name provided by the caller 210 are retrieved, the disambiguation module 263 takes the disambiguation information provided by the caller 210 to uniquely distinguish a particular mobile telephone user from the plurality of mobile telephone users in the database.

If a unique person is not established with the provided name and disambiguation information, the contact facilitator 240 may request more disambiguation information from the caller 210 until a unique mobile telephone user is disambiguated.

The contact facilitator 240 may refuse to provide any further information to the caller 210 except to state that the name and disambiguation information is not sufficient to distinguish one mobile telephone user, provide contact information to the caller 210 of each mobile telephone user identified if the respective profiles permit it, or the contact facilitator 240 could be programmed to continue in the manner detailed below with each identified party 220.

The request processing module 264 accesses the profile database 254 to retrieve the profile information corresponding to the mobile telephone user identified by the called party information gathering module 262. The called party's 220 profile includes instructions as to whether the call should be connected immediately. If so, then response disposal module 265 retrieves the mobile telephone number of the called party from the listing database 252 and connects the caller 210 with the called party 220. At this point, the caller's request is completed.

If the called party has not specified that the call should be connected immediately, the request processing module 264 checks to see if the called party wishes to have the call batched for transmittal at a later time. If so, the time at which all batched calls should be sent to the called party and the modality to be used for notifying the called party of the batched calls, such as telephone, email, or SMS, is specified within the profile. The profile instructions may specify the type of information the called party 220 wishes to be sent in the batched call message, such as the identity of the caller, other information specified by the called party in the profile such as the disambiguation information provided by the caller, or messages left by the caller. The response disposal module 265 batches the call according to the profile instructions. After batching the call, the response disposal module 265 updates the caller 210 that the call will be batched for later transmission to the called party 220. The response disposal module 265 is also responsible for transmitting the batched calls at the specified time and manner according to the profile instructions.

If the profile does not include instructions for immediately connecting the call or batching the call, the called party 220 is notified by the contact module 266 according to the instructions specified in the profile. Possible instructions include, but are not limited to, notifying the called party by SMS, emailing the called party, or making a telephone call to the called party. The contact module 266 obtains the number of the called party by retrieving the information from the listing database 252. Alternatively, the profile may indicate a specific number to use to contact the called party. The information provided to the called party 220 during the notification may include the identity of the caller, the disambiguation information provided by the caller, or any message left by the caller.

The profile may also specify whether the contact module 266 should await an immediate response from the called party 220 after notification of the call. If the profile instructs the contact module 266 to wait for a response, the contact facilitator 240 may designate a timeout limit. Thus, if the contact module 265 does not receive a response from the called party 220 within the allotted timeout limit, the contact module 265 will cease to wait for a response, and the response disposal module 264 will update the caller. An update to the caller would include information stating that the called party has been notified along with any other additional messages the called party has indicated in the profile.

If the party responds within the time allotted for a response, the response disposal module 265 will follow those directions. Possible directions include, but are not limited to, connecting the caller immediately or at a specified time, not providing any information about the called party to the caller, or transmitting specific information to the caller.

Additional modules or fewer modules may be implemented without departing from the true spirit and scope of the present disclosure. Note that the modules could be implemented in one or more instances of software. The functionalities described herein need not be implemented in separate modules, for example, one or more functions, such as the request processing module and the response disposal module, can be implemented in one software instance and/or one software/hardware combination. Other combinations can similarly be contemplated. Further, the order in which modules implement their respective functionalities may be changed and still not depart from the scope of the present disclosure.

Figure 3:
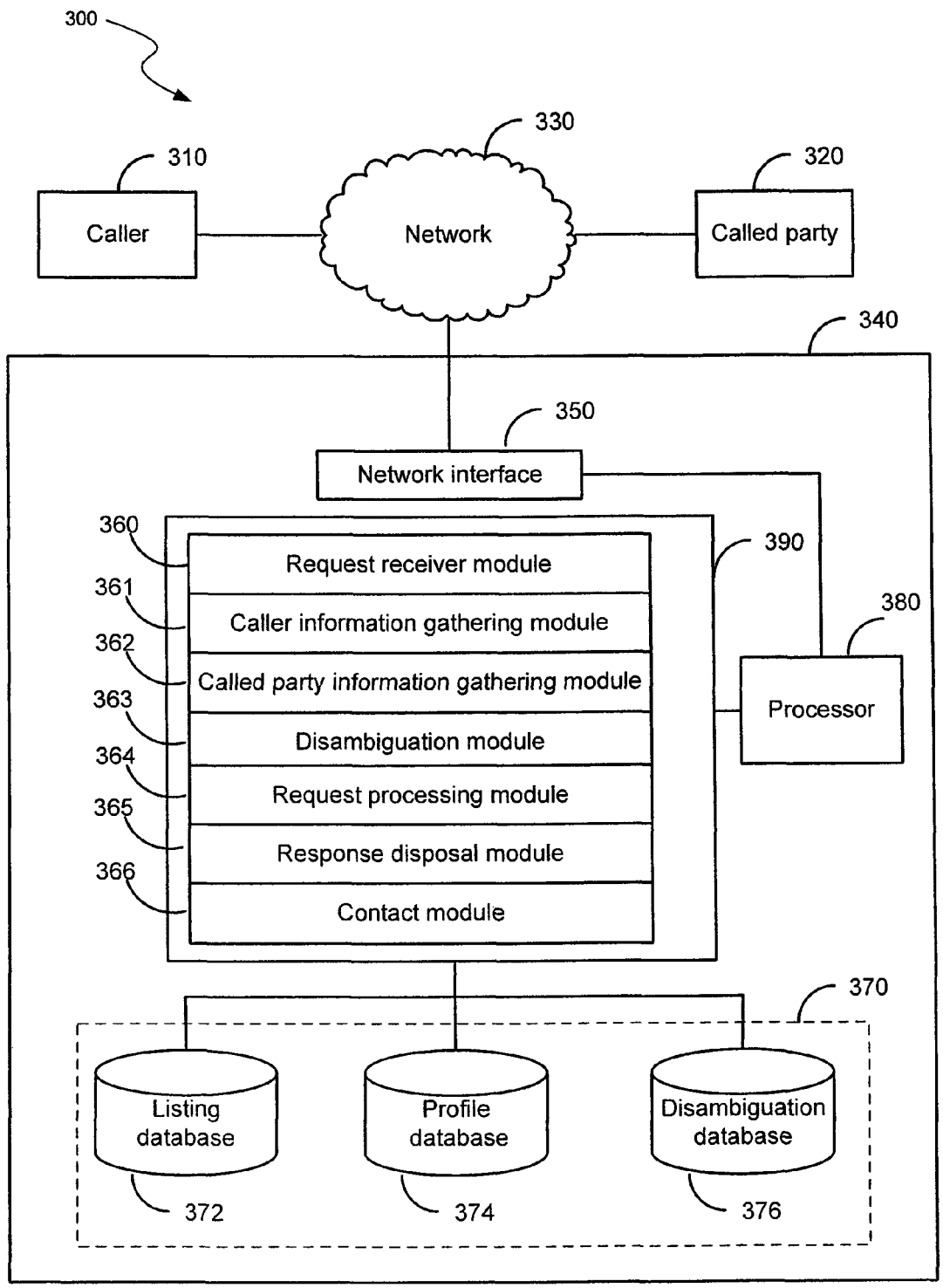
FIG. 3 is a diagram showing an example of the flow of communications to and from a privacy-enabled telephone directory.

FIG. 3 is an overview 300 of the flow of communications sent among the caller 310, the contact facilitator 320 in the PETD, and the called party 330. The caller 310 initiates a request by sending the request in communication 340 to the contact facilitator 320. Communications may ensue between the contact facilitator 320 requesting more identification information from the caller 310 by way of communication 370 and the caller 310 responding with further information by way of communication 340.

After the caller 310 is identified, further communications follow. The contact facilitator 320 requests disambiguation through communication 370, and the caller 310 responds with disambiguation information through communication 340. An exchange of communications continues until the party to be reached has been disambiguated from the plurality of mobile telephone users in the database.

After applying the disambiguation information provided by the caller 310 to disambiguate the party that the caller 310 wishes to reach and identifying the called party 330, the contact facilitator 320 checks the profile of the identified called party 330 for further instructions. If the profile indicates that the contact facilitator 320 should connect the caller 310 immediately, then the connection 380 is completed by the contact facilitator 320.

If the profile indicates that the request should be batched, the contact facilitator 320 batches the call for delivery in communication 350 to the called party 330 at the designated time in the designated manner. The caller 310 is also updated by communication 370 at the time the decision to batch the request is made.

If the profile does not indicate that either the connection should be made immediately or that the request should be batched, the contact facilitator 320 notifies the called party 330 in communication 350. If a response 360 is received within a predetermined time period, the contact facilitator 320 will respond accordingly. The response 360 may include connecting the caller 310 with the called party 330 through communication 380, conveying a message from the called party 330 to the caller 310 in communication 370, or taking a message from the caller 310 in communication 340 and transmitting the message to the called party 330.

Mobile telephone users may automatically be included in the privacy-enabled telephone directory or only included in the telephone directory upon request. In either case, default entries for the disambiguation and profile database could be implemented by the contact facilitator, and a mobile telephone user would log in to enter identifying information to be used in the disambiguation database and instructions in the profile database. Mobile telephone users may update their information in the databases or their profile at any time they wish, thus providing users with the flexibility to change how they wish to be contacted, if at all.

The above examples do not limit the applications in which the PETD may be used or the manner in which the PETD may be implemented. Some other examples of how the PETD may be implemented are described below.

The privacy-enabled telephone directory may be used in either an interactive or non-interactive mode. In an interactive mode, the caller is prompted by the contact facilitator for information including the caller's identification information and any additional disambiguation information needed to distinguish a mobile telephone user to be reached from all of the other mobile telephone users in the database. In a non-interactive mode, the caller may be given instructions prior to the beginning of the request on the type of information required. If the information provided by the caller is insufficient for any reason, the system may refuse the current request and require the caller to start again with a new request.

The privacy-enabled telephone directory may be used for a large or small group of subscribers; the number of subscribers is immaterial to the operation of the directory and the contact facilitator. However, if the PETD is enabled for a large group of subscribers, more disambiguation information or more specific disambiguation information may be required of the caller wishing to reach a particular mobile telephone user.

A privacy-enabled telephone directory may be offered by a service provider suitable for managing contact information for one company or multiple related companies, for example Microsoft Corporation and its subsidiaries. For this example, pieces of disambiguation information that may be useful include, but are not limited to, a party's supervisor, group name or number, the project that the called party is currently working on or has worked on in the past, an office building, or a worksite location. The contact information that a caller may be seeking include, but are not limited to, the called party's mobile telephone number, email address, office address, home address, supervisor, or any other information useful to the business of the specific companies using the PETD service.

Another application where a privacy-enabled telephone directory may be useful in managing contact information is across university campuses. A university may have members of its community located at one or several locations, universities permitting cross-registration, and universities conducting joint projects with other universities may also benefit from a PETD implemented for the several locations. In this example, pieces of disambiguation information that may be useful include, but are not limited to, a supervisor, thesis advisor, department, class year, on-campus employer, and classes in which the party to be called is currently or enrolled or has been enrolled in previously.

The above detailed description of examples of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having functions, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, or may be performed at different times.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of processing a request received from a caller to contact a mobile telephone user, the mobile telephone user having a telephone number, the method, comprising:
   receiving the request from the caller, the request including information provided by the caller, the information including a name of the mobile telephone user and additional information to distinguish the mobile telephone user from other mobile telephone users, the information not including the telephone number;
   disambiguating the mobile telephone user using the name and additional information provided by the caller, wherein the caller provides the additional information without having to be instructed to provide additional information after the request is received;
   after disambiguating the mobile telephone user, accessing a profile for the mobile telephone user indicating whether to connect the caller to the mobile telephone user using a telephone number of the mobile telephone user or to notify the mobile telephone user that the caller is requesting to contact the mobile telephone user; and
   processing the request in accordance with the profile.

2. The method as claimed in claim 1 wherein, the profile includes instructions as to whether the request is to be batched for later transmittal or for immediate connection.

3. The method as claimed in claim 1 further comprising identifying the caller by extracting caller identification information provided by a network or the caller.

4. The method as claimed in claim 1, wherein the request includes a name and disambiguation information to identify the mobile telephone user.

5. The method as claimed in claim 1, wherein the request includes a password previously selected by the mobile telephone caller to be used in disambiguating the mobile telephone user.

6. The method as claimed in claim 1 further comprising accessing a database of mobile telephone users; using disambiguation information provided by the caller to distinguish the mobile telephone user.

7. The method as claimed in claim 1, wherein the profile includes notification preferences.

8. The method as claimed in claim 1, wherein the profile further specifies a time and modality for batching.

9. The method as claimed in claim 8, wherein the modality is selected from a telephone call, email, or SMS text messaging.

10. A system for facilitating contact, the system comprising:
    one or more processors adapted to:
    receive a request to contact a telephone user from a caller, the request including identification information and additional information to distinguish the telephone user from other telephone users, the identification information and the additional information not including a telephone number of the telephone user;
    identify the telephone user from the identification information and additional information using a disambiguation database, the disambiguation database includes a privacy-enabled telephone directory used for managing contact information in an academic organization;
    access the telephone user's profile in a profile database indicating a preference of the telephone user for processing requests to contact the telephone user and process the request responsive to instructions in the profile by
    when the profile indicates to connect the caller to the telephone user, directing the connecting of the caller to the telephone user; and
    when the profile indicates to notify the telephone user of the request from the caller, notifying the telephone user that the caller is requesting to contact the user; and
    processing the request in accordance with a response to the notifying received from the telephone user.

11. The system of in claim 10, wherein the one or more processors being further adapted to retrieve the telephone user's telephone number based on the identification of the telephone user and place a call to the telephone number over a telephony network according to instructions in the profile.

12. The system of claim 10, wherein the telephone user's profile including instructions as to whether the request is to be batched for later transmittal or for immediate connection.

13. The system of claim 10, wherein the request comprises a name of the mobile telephone user and disambiguation information.

14. A system for processing a request received from a caller to contact a mobile telephone user, the mobile telephone user having a telephone number, the method, comprising:
    one or more processors adapted to
    receive the request from the caller, the request including information provided by the caller, the information including a name of the mobile telephone user and additional information to distinguish the mobile telephone user from other mobile telephone users, the information not including the telephone number;
    disambiguate the mobile telephone user using the name and additional information provided by the caller, wherein the caller provides the additional information without having to be instructed to provide additional information after the request is received;
    after disambiguating the mobile telephone user, access a profile for the mobile telephone user indicating whether to connect the caller to the mobile telephone user using a telephone number of the mobile telephone user or to notify the mobile telephone user that the caller is requesting to contact the mobile telephone user; and
    process the request in accordance with the profile.

15. The system as claimed in claim 14 wherein, the profile includes instructions as to whether the request is to be batched for later transmittal or for immediate connection.

16. The system as claimed in claim 14 wherein one or more processors are further adapted to identify the caller by extracting caller identification information provided by a network or the caller.

17. The system as claimed in claim 14, wherein the request includes a name and disambiguation information to identify the mobile telephone user.

18. The system as claimed in claim 14, wherein the request includes a password previously selected by the mobile telephone caller to be used in disambiguating the mobile telephone user.

\* \* \* \* \*